(12) United States Patent
Asukabe

(10) Patent No.: US 9,392,183 B2
(45) Date of Patent: Jul. 12, 2016

(54) IMAGING APPARATUS AND SHUTTER OPERATION SELECTING METHOD

(71) Applicant: SONY CORPORATION, Tokyo (JP)

(72) Inventor: Yuki Asukabe, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/584,766

(22) Filed: Dec. 29, 2014

(65) Prior Publication Data
US 2015/0116584 A1 Apr. 30, 2015

Related U.S. Application Data

(63) Continuation of application No. 13/269,695, filed on Oct. 10, 2011, now Pat. No. 8,964,075.

(30) Foreign Application Priority Data

Dec. 13, 2010 (JP) .................................. 2010-276630

(51) Int. Cl.
*H04N 5/235* (2006.01)
*G03B 7/18* (2006.01)
*G03B 9/36* (2006.01)

(52) U.S. Cl.
CPC ................ *H04N 5/2353* (2013.01); *G03B 7/18* (2013.01); *G03B 9/36* (2013.01)

(58) Field of Classification Search
CPC .... H04N 5/235; H04N 5/2353; H04N 5/2351
See application file for complete search history.

(56) References Cited

U.S. PATENT DOCUMENTS

| 8,786,743 B2 | 7/2014 | Asukabe | |
|---|---|---|---|
| 2005/0225664 A1* | 10/2005 | Matsumoto | H04N 5/2353 348/362 |
| 2008/0298791 A1* | 12/2008 | Noda | G03B 7/00 396/55 |
| 2009/0167911 A1* | 7/2009 | Takane | H04N 5/23248 348/296 |

(Continued)

FOREIGN PATENT DOCUMENTS

| JP | 2005-184380 A | 7/2005 |
|---|---|---|
| JP | 2007-53742 A | 3/2007 |
| JP | 2007-251382 A | 9/2007 |

(Continued)

OTHER PUBLICATIONS

Office Action issued Jun. 17, 2014 in Japanese Patent Application No. 2010-276630 (with English language translation).

(Continued)

*Primary Examiner* — Christopher K Peterson
(74) *Attorney, Agent, or Firm* — Oblon, McClelland, Maier & Neustadt, L.L.P.

(57) ABSTRACT

An imaging apparatus includes: an imaging device that includes a plurality of pixels; a first curtain that travels to block incidence of light on the imaging device; a second curtain that permits the incidence of light on the imaging device earlier than the traveling of the first curtain; a reset unit that sequentially reset-scans lines of the pixels earlier than the traveling of the first curtain; and an operation selecting unit that selects one of a mechanical shutter operation performed by the traveling of the first curtain and the second curtain and an electronic shutter operation performed by the first curtain and the reset unit depending on a slit width formed by the first curtain and the second curtain or a slit width formed by the first curtain and the reset-scanning of the reset unit.

21 Claims, 13 Drawing Sheets

(56) References Cited

U.S. PATENT DOCUMENTS

2009/0213233 A1\* 8/2009 Kido .................. G03B 7/093
　　　　　　　　　　　　　　　　　　348/208.4
2011/0001870 A1 　 1/2011 Yamamoto

FOREIGN PATENT DOCUMENTS

| JP | 2009-290732 A | 12/2009 |
| JP | 2010-41510 | 2/2010 |
| WO | 2007/094282 A1 | 8/2007 |

OTHER PUBLICATIONS

Combined Office Action and Search Report issued Dec. 7, 2015 in Chinese Patent Application No. 201110401410.3 (with English language translation).

\* cited by examiner

FIG.5
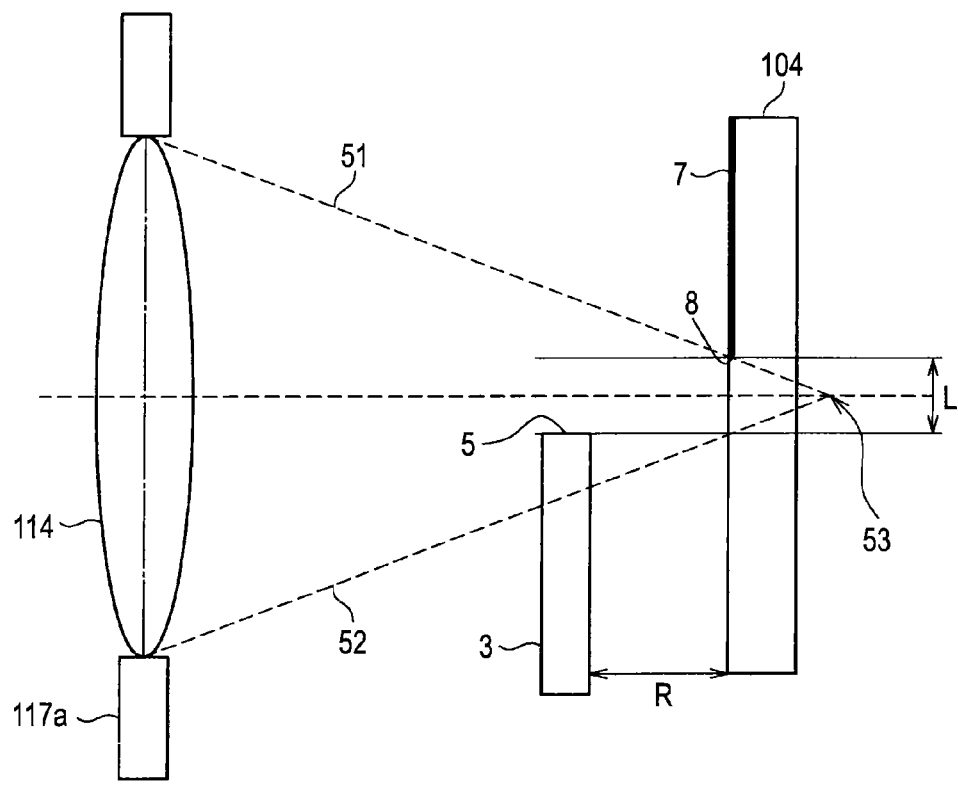
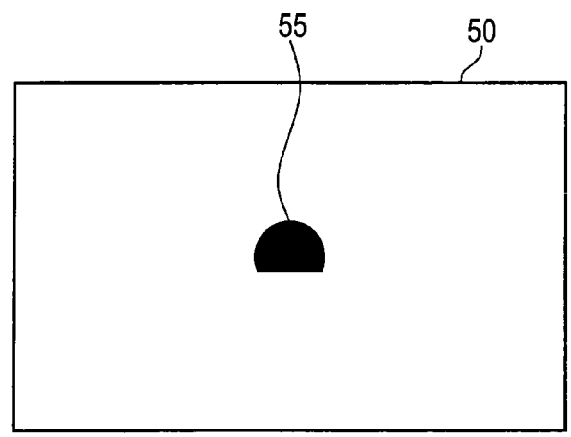

FIG.6
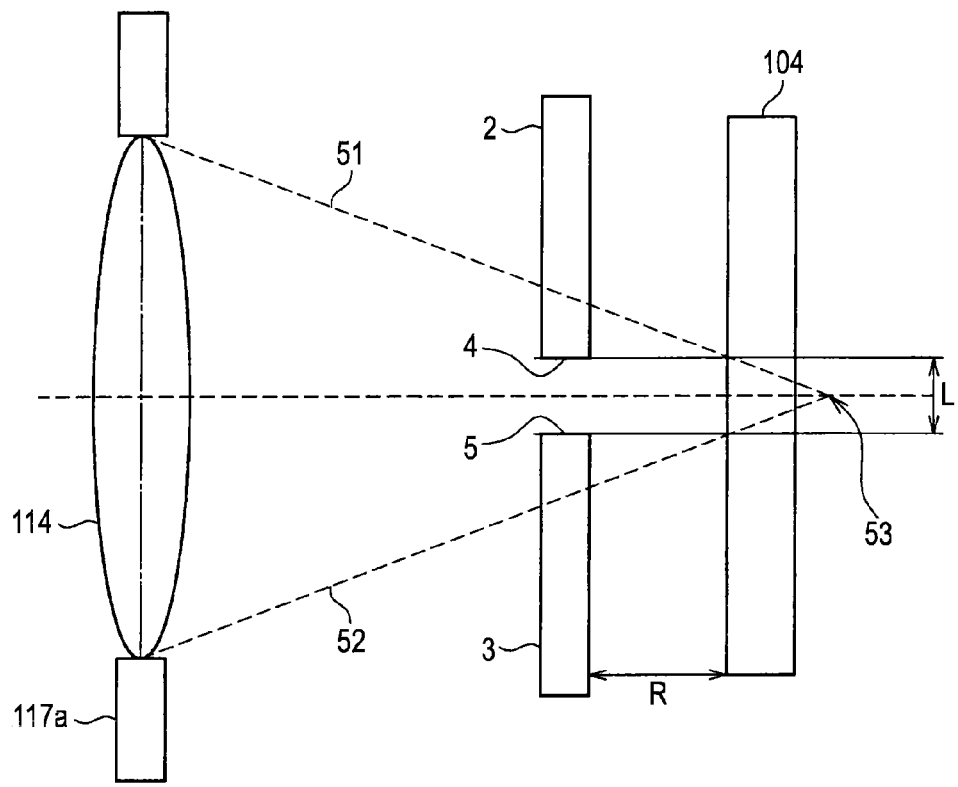
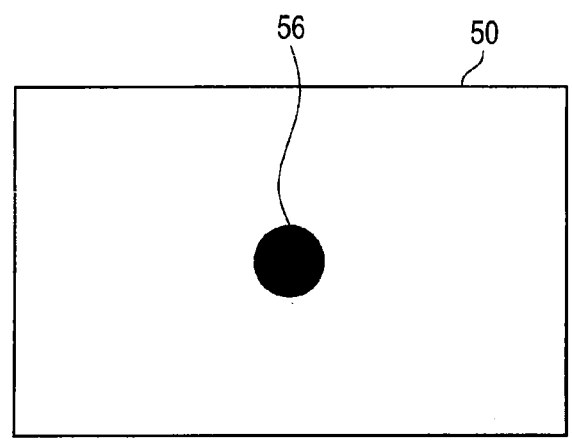

FIG.8
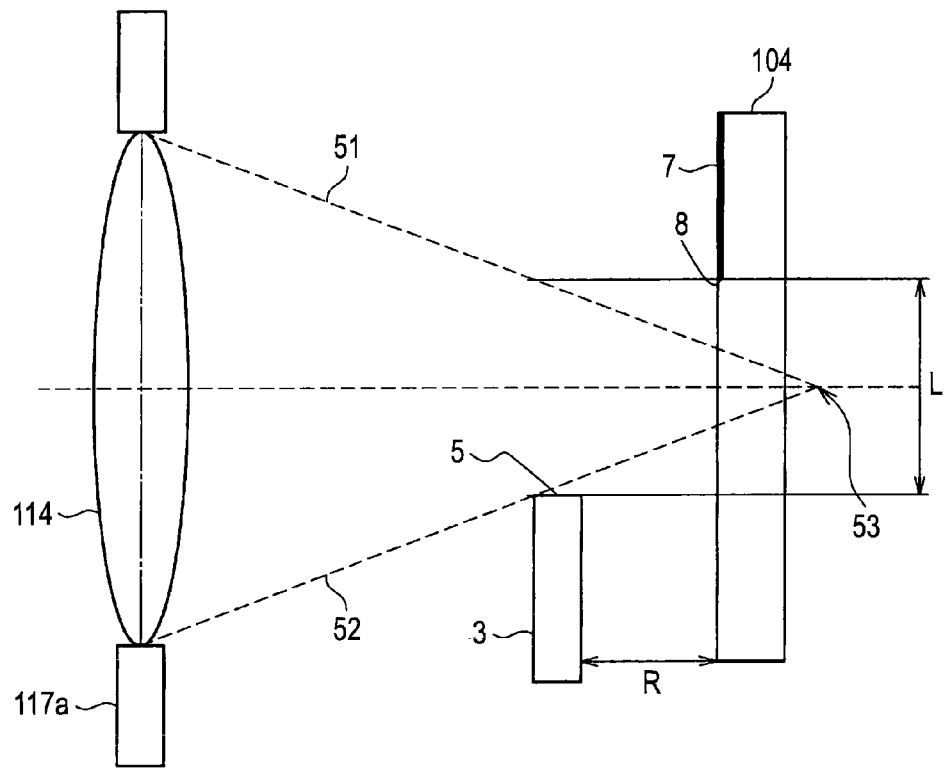
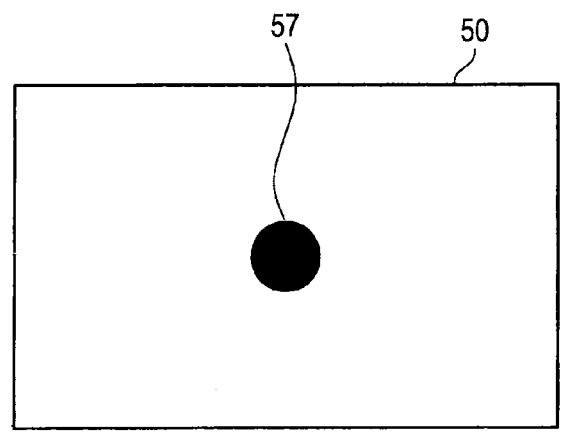

FIG.9
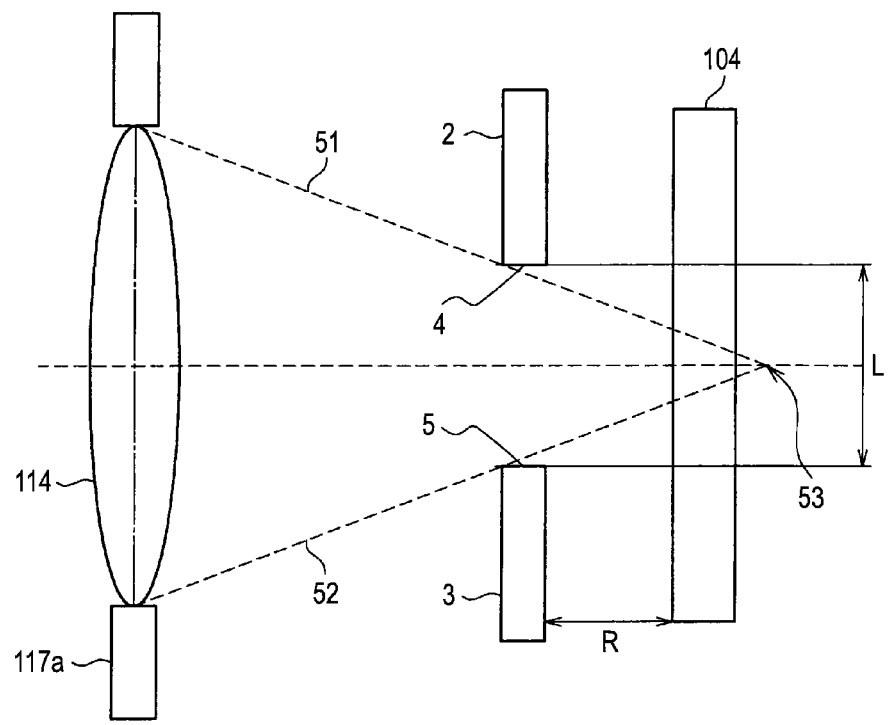
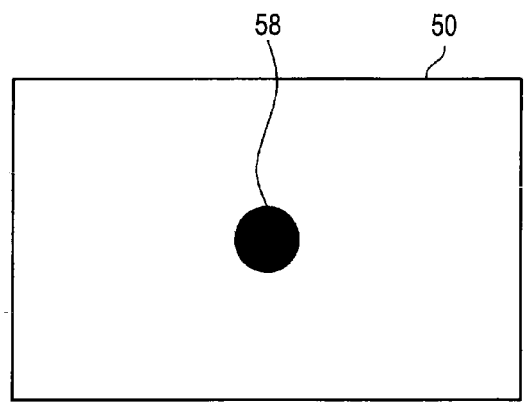

FIG.10
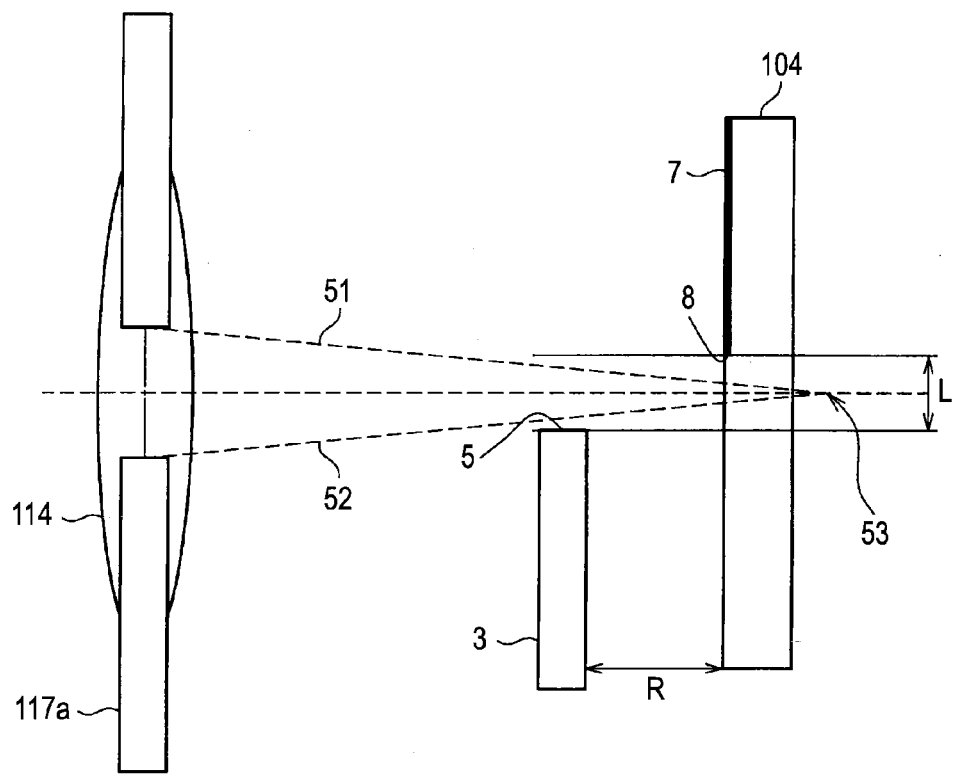
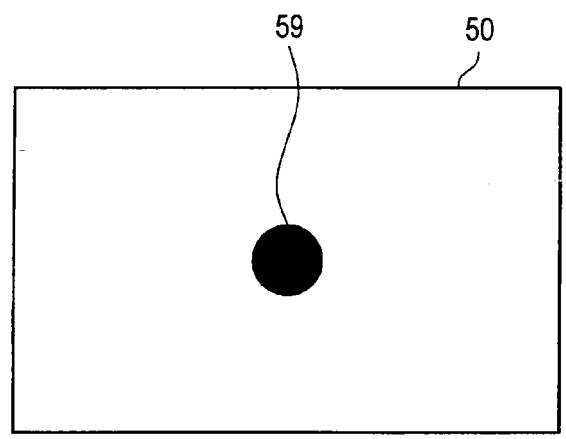

FIG.11
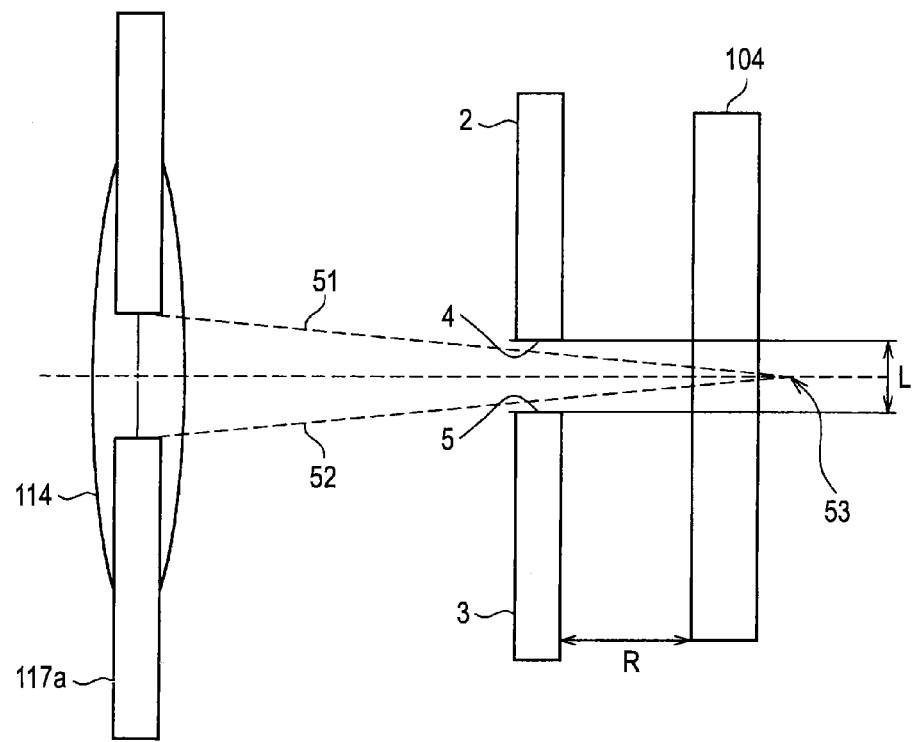
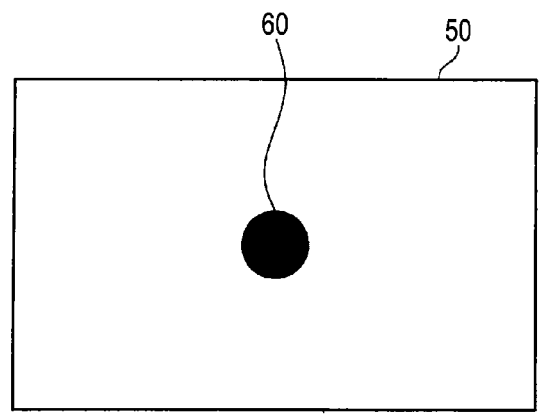

IMAGING APPARATUS AND SHUTTER OPERATION SELECTING METHOD

CROSS-REFERENCE TO RELATED APPLICATIONS

This application is a continuation of U.S. patent application Ser. No. 13/269,695, filed Oct. 10, 2011, which contains subject matter related to that disclosed in Japanese Priority Patent Application JP 2010-276630 filed in the Japan Patent Office on Dec. 13, 2010. The entire contents of these applications are incorporated by reference herein.

FIELD

The present disclosure relates to an imaging apparatus and a shutter operation selecting method.

BACKGROUND

In single-lens reflex digital cameras having been spread in recent years, an electronic shutter together using an electronic front curtain and a mechanical rear curtain has been used (see JP-A-2010-41510).

In such an electronic shutter, the rear curtain is constructed by a mechanical shutter and a reset scanning operation of resetting an amount of charges accumulated in pixels of an imaging device to zero is performed by lines earlier than the traveling the rear curtain. Thereafter, by performing a scanning operation of reading a signal with an elapse of predetermined time for each line having been subjected to the reset scanning operation, an imaging operation using the electronic shutter is realized.

SUMMARY

However, in a digital camera employing the electronic shutter, there is a problem in that a defocused image wanes when an image is captured at a high shutter speed (SS). The wane of the defocused image lowers the quality of the captured image.

Therefore it is desirable to provide new and improved imaging apparatus and shutter operation selecting method which can avoid wane of a defocused image.

An embodiment of the present disclosure is directed to an imaging apparatus including: an imaging device that includes a plurality of pixels; a first curtain that travels to block incidence of light on the imaging device; a second curtain that permits the incidence of light on the imaging device earlier than the traveling of the first curtain; a reset unit that sequentially reset-scans lines of the pixels earlier than the traveling of the first curtain; and an operation selecting unit that selects one of a mechanical shutter operation performed by the traveling of the first curtain and the second curtain and an electronic shutter operation performed by the first curtain and the reset unit depending on a slit width formed by the first curtain and the second curtain or a slit width formed by the first curtain and the reset-scanning of the reset unit.

The operation selecting unit may select the mechanical shutter operation when the slit width is smaller than a first threshold value.

Another embodiment of the present disclosure is directed to an imaging apparatus including: an imaging device that includes a plurality of pixels; a first curtain that travels to block incidence of light on the imaging device; a second curtain that permits the incidence of light on the imaging device earlier than the traveling of the first curtain; a reset unit that sequentially reset-scans lines of the pixels earlier than the traveling of the first curtain; and an operation selecting unit that selects one of a mechanical shutter operation performed by the traveling of the first curtain and the second curtain and an electronic shutter operation performed by the first curtain and the reset unit depending on a shutter speed.

The operation selecting unit may select the mechanical shutter operation when the shutter speed is higher than a second threshold value.

The operation selecting unit may select the mechanical shutter operation when the shutter speed is higher than a second threshold value and a defocus value of a subject is larger than a fourth threshold value.

Still another embodiment of the present disclosure is directed to an imaging apparatus including: an imaging device that includes a plurality of pixels; a first curtain that travels to block incidence of light on the imaging device; a second curtain that permits the incidence of light on the imaging device earlier than the traveling of the first curtain; a reset unit that sequentially reset-scans lines of the pixels earlier than the traveling of the first curtain; and an operation selecting unit that selects one of a mechanical shutter operation performed by the traveling of the first curtain and the second curtain and an electronic shutter operation performed by the first curtain and the reset unit depending on an F value of an imaging lens.

The operation selecting unit may select the mechanical shutter operation when the F value is smaller than a third threshold value.

The operation selecting unit may select the mechanical shutter operation when the shutter speed is higher than a second threshold value and the F value is smaller than a third threshold value.

The operation selecting unit may select the mechanical shutter operation when the shutter speed is higher than a second threshold value, the F value is smaller than a third threshold value, and a defocused value of a subject is larger than a fourth threshold value.

The operation selecting unit may select the mechanical shutter operation when the F value is smaller than a third threshold value and a defocused value of a subject is larger than a fourth threshold value.

The imaging apparatus may further include an interchangeable lens unit and the operation selecting unit may acquire the F value from the lens unit.

The imaging apparatus may further include a calculation unit that calculates the defocused value on the basis of at least one of a contrast component of a subject image and a distance to the subject.

The imaging apparatus may further include an image synthesizing unit that synthesizes a plurality of images captured by the shutter operation selected by the operation selecting unit.

The imaging apparatus may further include a display unit that displays a type of the shutter operation so as to inform a user of the type of the shutter operation selected by the operation selecting unit.

The selection of the shutter operation by the operation selecting unit may be inhibited when the image-capturing mode of the imaging apparatus is a predetermined image-capturing mode.

The operation selecting unit may select the mechanical shutter operation when the slit width at the time of starting the traveling of the first curtain is smaller than a predetermined value.

Yet another embodiment of the present disclosure is directed to a shutter operation selecting method in an imaging apparatus having an imaging device that includes a plurality of pixels; a first curtain that travels to block incidence of light on the imaging device, a second curtain that permits the incidence of light on the imaging device earlier than the traveling of the first curtain, and a reset unit that sequentially reset-scans lines of the pixels earlier than the traveling of the first curtain, the shutter operation selecting method including: determining a slit width formed by the first curtain and the second curtain or a slit width formed by the first curtain and the reset-scanning of the reset unit; and selecting one of a mechanical shutter operation performed by the traveling of the first curtain and the second curtain and an electronic shutter operation performed by the first curtain and the reset unit depending on the slit width.

Still yet another embodiment of the present disclosure is directed to a shutter operation selecting method in an imaging apparatus having an imaging device that includes a plurality of pixels, a first curtain that travels to block incidence of light on the imaging device, a second curtain that permits the incidence of light on the imaging device earlier than the traveling of the first curtain, and a reset unit that sequentially reset-scans lines of the pixels earlier than the traveling of the first curtain, the shutter operation selecting method including: determining a shutter speed; and selecting one of a mechanical shutter operation performed by the traveling of the first curtain and the second curtain and an electronic shutter operation performed by the first curtain and the reset unit depending on the shutter speed.

Further another embodiment of the present disclosure is directed to a shutter operation selecting method in an imaging apparatus having an imaging device that includes a plurality of pixels, a first curtain that travels to block incidence of light on the imaging device, a second curtain that permits the incidence of light on the imaging device earlier than the traveling of the first curtain, and a reset unit that sequentially reset-scans lines of the pixels earlier than the traveling of the first curtain, the shutter operation selecting method including: determining an F value of an imaging lens; and selecting one of a mechanical shutter operation performed by the traveling of the first curtain and the second curtain and an electronic shutter operation performed by the first curtain and the reset unit depending on the F value.

According to the above-mentioned embodiments of the present disclosure, it is possible to avoid the wane of a defocused image.

BRIEF DESCRIPTION OF THE DRAWINGS

FIG. 5 is a diagram illustrating wane of a defocused image occurring at a high SS at the time of an image capturing operation using the electronic shutter mechanism;

FIG. 6 is a diagram illustrating a state where the wane of a defocused image does not occur at a high SS at the time of an image capturing operation using the electronic shutter mechanism;

FIG. 8 is a diagram illustrating a state where the wane of a defocused image is prevented by setting the shutter speed to a low speed at the time of the image capturing operation using the electronic shutter mechanism;

FIG. 9 is a diagram illustrating a state where the wane of a defocused image does not occur at the same shutter speed as shown in FIG. 8 at the time of the image capturing operation using the mechanical shutter mechanism;

FIG. 10 is a diagram illustrating a state where the wane of a defocused image does not occur at the time of the image capturing operation at a high SS using the electronic shutter mechanism because an F value is dark;

FIG. 11 is a diagram illustrating a state where the wane of a defocused image does not occur at the same shutter speed as shown in FIG. 10 at the time of the image capturing operation using the mechanical shutter mechanism;

DETAILED DESCRIPTION

Figure 1:
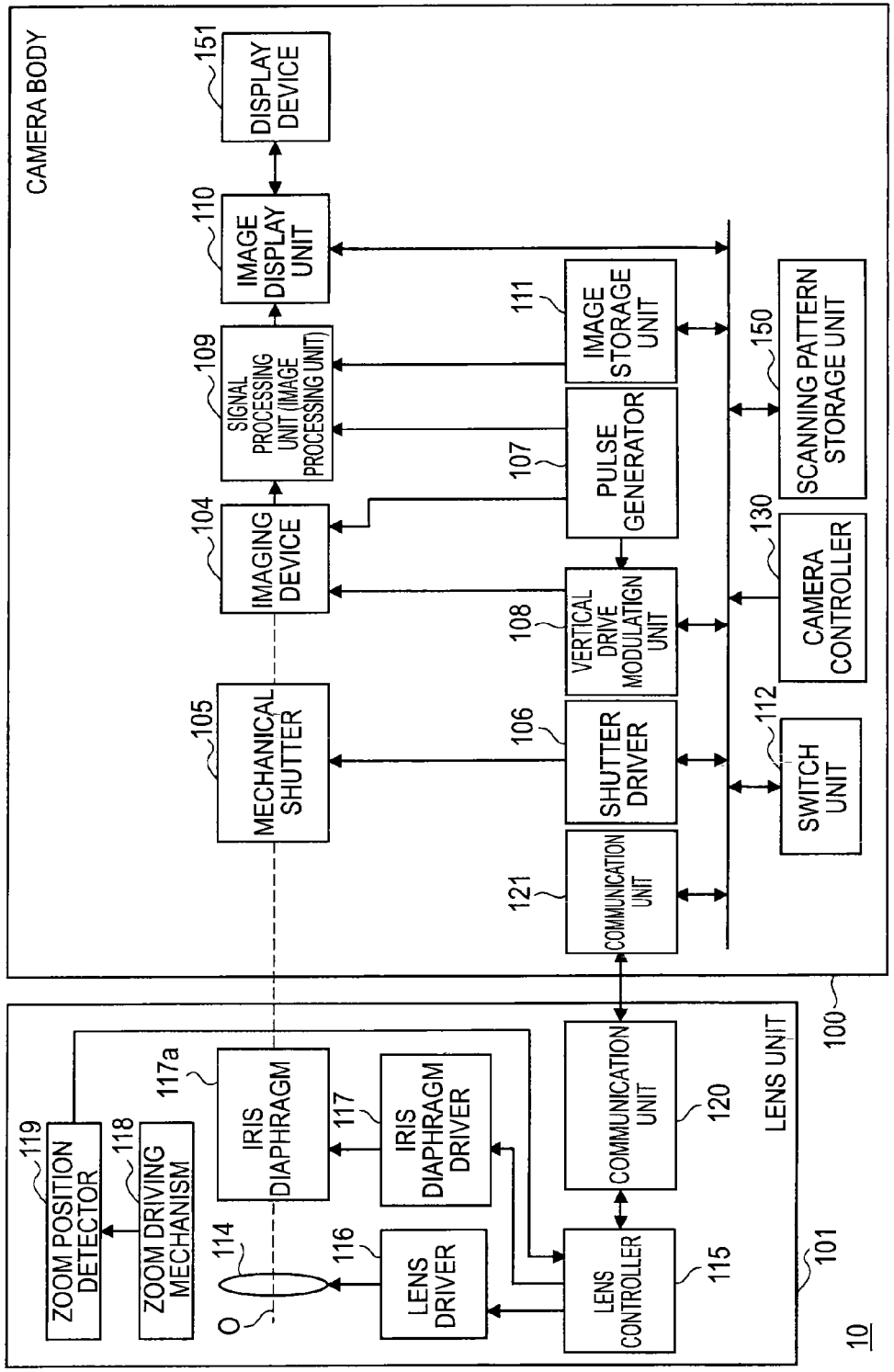
FIG. 1 is a diagram illustrating the basic configuration of an imaging apparatus according to embodiments of the present disclosure.

Hereinafter, preferred embodiments of the present disclosure will be described in detail with reference to the accompanying drawings. In this specification and the accompanying drawings, constituent elements having substantially the same functional configuration will be referenced by the same reference numerals and signs and description thereof will not be repeated.

The description is made in the following order.

1. Basic Configuration of Imaging Apparatus of Embodiment
2. First Embodiment
(2-1) Important Configuration of Imaging Apparatus
(2-2) Operation of Imaging Apparatus
3. Second Embodiment
4. Third Embodiment
5. Conclusion

1. Basic Configuration of Imaging Apparatus Embodiment

The present disclosure can be put into practice in various forms as described in detail in "2. First Embodiment" to "4. Third Embodiment" as an example.

In this specification, an imaging apparatus 10 (an interchangeable lens type digital camera) is described as an example of an imaging apparatus, but the imaging apparatus is not limited to the example. Examples of the imaging apparatus include a lens-incorporated digital camera, a silver salt camera, a video camera, and an apparatus capturing a still image.

The basic configuration common to the preferred embodiments will be first described with reference to FIGS. 1 to 4.
(Configuration)

FIG. 1 is a diagram illustrating the basic configuration of an imaging apparatus 10 according to the embodiments of the present disclosure. As shown in FIG. 1, the imaging apparatus 10 according to the embodiments includes a camera body 100 and an interchangeable lens unit 101 as an image-capturing optical system attached to the camera body 100.

First, the internal configuration of the lens unit 101 will be described. The lens unit 101 includes an imaging lens 114, a lens controller 115, a lens driver 116, an iris diaphragm driver 117, an iris diaphragm 117a, a zoom driving mechanism 118, a zoom position detector 119, and a communication unit 120.

The imaging lens 114 can move in an optical axis direction. Although it is shown in FIG. 1 that the imaging lens 114 includes a single lens, the imaging lens actually includes plural lenses such as a focus lens and a zoom lens. The lens controller 115 controls the lens driver 116 to drive the imaging lens 114, controls the iris diaphragm driver 117 to drive the iris diaphragm 117a, and controls the iris diaphragm to correspond to subject brightness when performing an image capturing operation. By operating (manually operating in the embodiments) the zoom driving mechanism 118, the position of the zoom lens can be shifted. The position (focal distance) of the operated zoom lens is detected by the zoom position detector 119 and is sent to the lens controller 115. The lens controller 115 can communicate with a camera controller 130 in the camera body 100 to be described later via the communication unit 120 of the lens unit 101 and a communication unit 121 of the camera body 100. The lens controller 115 sends lens information such as the type of the lens unit 101, the focal distance, the exit pupil distance, and the focal position (focus position) to the camera controller 130 via the communication units 120 and 121.

The configuration of the camera body 100 will be described below. The camera body 100 includes an imaging device 104, a mechanical shutter 105, a shutter driver 106, a pulse generator 107, a vertical drive modulating unit 108, a signal processing unit 109, an image display unit 110, an image storage unit 111, a switch unit 112, a communication unit 121, a camera controller 130, a scanning pattern storage unit 150, and a display device 151.

When the imaging apparatus 10 is in a non-image-capturing state, a subject light beam passing through the imaging lens 114 and the iris diaphragm 117a of the lens unit 101 travels to the imaging device 104 constructed by a CMOS (Complementary Metal Oxide Semiconductor) sensor, a CCD (Charge Coupled Device), or the like. The pixels of the imaging device 104 photoelectrically convert a subject image optical formed by the lens unit 101 during the exposure depending on the light intensity and accumulate the acquired charges. The accumulated charges are sent to the signal processing unit 109 and image data generated in real time by the signal processing unit 109 are output to the display device 151 via the image display unit 110 and are displayed as a real-time image. Accordingly, a camera operator can observe the subject image on the display device 151.

When a release button not shown and described later is pushed and the non-image-capturing state is changed to an image-capturing state, the imaging device 104 is supplied with a scanning clock (a horizontal driving pulse) or a predetermined control pulse from the pulse generator 107. A vertical scanning clock out of scanning clocks generated by the pulse generator 107 is modulated into a predetermined clock frequency by the vertical drive modulating unit 108 and is input to the imaging device 104. A scanning pattern of a reset scanning performed on lines of the imaging device 104 is determined by the vertical drive modulating unit 108. The function of an electronic front curtain is implemented by the reset scanning on the lines of the imaging device 104. The pulse generator 107 outputs a clock signal to the signal processing unit 109 to be described later.

A focal plane shutter (hereinafter, referred to as a "mechanical shutter") 105 which is a mechanical shutter is disposed closer to a subject (the lens) than the imaging device 104. The mechanical shutter 105 includes a front curtain (hereinafter, referred to as a "mechanical front curtain") including plural light-shielding blades and a rear curtain (hereinafter, referred to as a "mechanical rear curtain") including plural light-shielding blades.

Here, the imaging apparatus 10 according to the embodiments includes both a mechanical shutter mechanism performing an image capturing operation using the mechanical front curtain and the mechanical rear curtain of the mechanical shutter 105 and an electronic shutter mechanism performing an image capturing operation using a reset scanning as an electronic front curtain performed by the imaging device 104 and the mechanical rear curtain of the mechanical shutter 105. The shutter mechanisms performing the exposure control of the imaging device 104 will be described in brief below.

In the mechanical shutter mechanism, the front curtain and the rear curtain are constructed by the mechanical shutter 105, the incidence of light on the imaging device 104 is permitted by causing the mechanical front curtain covering the imaging device 104 to travel, and the incidence of light on the imaging device 104 is blocked by subsequently causing the mechanical rear curtain to travel. Accordingly, the image capturing operation (the mechanical shutter operation) using the mechanical shutter is implemented. Here, the mechanical rear curtain blocking the incidence of light on the imaging device 104 corresponds to "the first curtain" described in the appended claims and the mechanical front curtain traveling earlier than the traveling of the mechanical rear curtain corresponds to "the second curtain" described in the appended claims.

In the electronic shutter mechanism, an electronic front curtain is constructed by the line reset scanning performed in the imaging device 104 and a rear curtain (the mechanical rear curtain) is constructed by the mechanical shutter 105. In such an electronic shutter mechanism, the reset-scanning operation of resetting an amount of charged accumulated in the pixels to zero is performed for each line including plural pixels of the imaging device 104. Thereafter, by sequentially shielding the imaging device by the use of the mechanical rear curtain after a predetermined time passes and then performing a reading scanning operation of sequentially reading the charges accumulated in the pixels, the image capturing operation (the electronic shutter operation) using the electronic shutter is implemented.

The shutter mechanisms are described in brief above and the details thereof will be described later with reference to FIGS. 3 to 6. In the drawings, only the configuration necessary for explaining the shutter mechanisms is shown but the imaging apparatus 10 according to the embodiments includes both mechanisms of the mechanical shutter mechanism and the electronic shutter mechanism.

The other configuration of the camera body 100 will be described below. The shutter driver 106 controls the traveling of the mechanical front curtain and the mechanical rear curtain of the mechanical shutter 105. The shutter driver 106 adjusts a slit width L by adjusting the time to start the traveling of the mechanical rear curtain and controls the exposure time (shutter speed SS).

The signal processing unit 109 generates image data by performing a correlation double sampling (CDS) process, a gain (AG) process, and predetermined processes (such as a coloring process and a gamma correction process) on the signal read from the imaging device 104. The generated image data is output to the display device 151 via the image display unit 110 and is displayed as a captured image, or is stored in the image storage unit 111. The signal processing unit 109 also serves as an image synthesizing unit synthesizing plural image data such as generated image data and image data stored in the image storage unit 111.

The switch unit 112 includes a switch controlling ON/OFF of a main power source, a switch operated to set image-capturing conditions and the like, and a switch (a release button) operated to start a preliminary image-capturing operation and an image-capturing operation. The preliminary image-capturing operation (such as a photometric operation or a focus adjusting operation) is started by a half pressing operation on the release button. The image-capturing operation (the exposure of the imaging device 104 and the reading of charge signals and the recording of image data obtained by processing the charge signals in a recording medium) is started by a full pressing operation.

The camera controller 130 is a CPU (Central Processing Unit) serving as an operation processing unit or a control unit and controls the overall operations of the imaging apparatus on the basis of various programs. The camera controller 130 operates to correspond to the operation on the switch unit 112.

The scanning pattern storage unit 150 stores plural types of scanning patterns of the electronic front curtain as described later. The scanning pattern is a pattern of the reset-scanning time performed on the lines of the imaging device 104 as the electronic front curtain.

Figure 2:
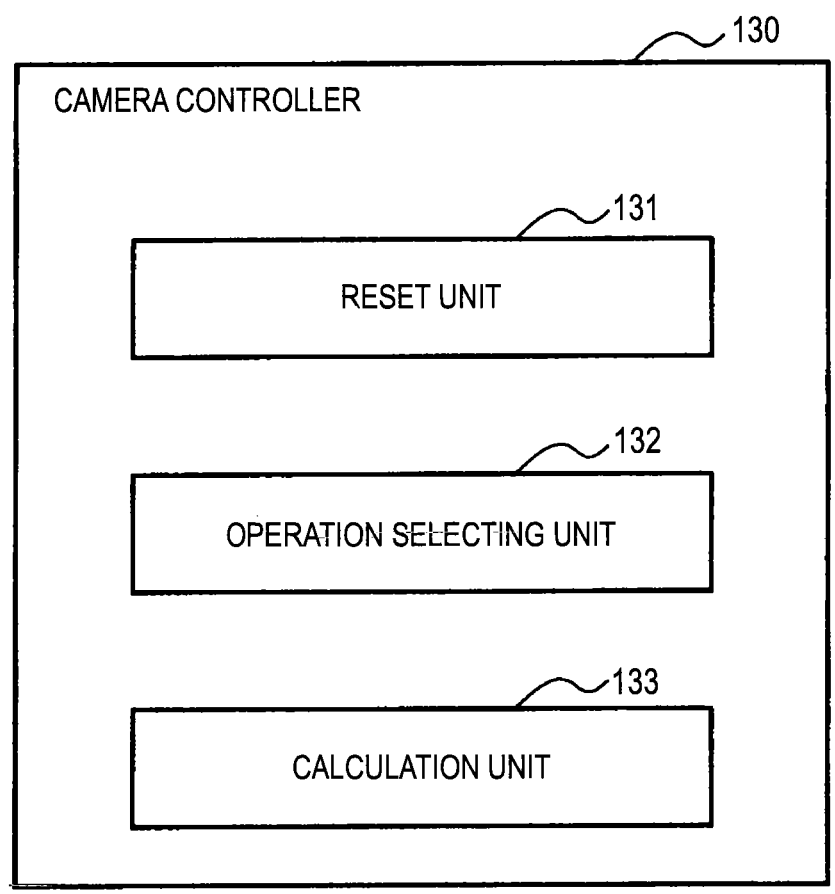
FIG. 2 is a functional block diagram illustrating the configuration of a camera controller according to the embodiments of the present disclosure.

The camera controller 130 will be described below with reference to FIG. 2. As shown in FIG. 2, the camera controller 130 includes a reset unit 131, an operation selecting unit 132, and a calculation unit 133.

The reset unit 131 implements the function of the electronic front curtain by sequentially reset-scanning the lines of pixels of the imaging device 104 at a predetermined time. Specifically, the reset unit 131 controls the vertical drive modulating unit 108 to input a reset-scanning clock to the imaging device 104 from the vertical drive modulating unit 108.

The operation selecting unit 132 performs a process of selecting one of the mechanical shutter operation and the electronic shutter operation. The operations electing unit 132 selects one shutter operation depending on at least one of the shutter speed, the F value, and the defocus value of a subject. The details of the selection process performed by the operation selecting unit 132 will be described later with reference to the flowchart shown in FIG. 7.

The calculation unit 133 performs a process of calculating the defocus value on the basis of at least one of a contrast component of a subject image and a distance to the subject. The details of the calculation process performed by the calculation unit 133 will be described later.

The processes of the units of the camera controller 130 are implemented by hardware (not shown) such as the CPU, a ROM (Read Only Memory), and a RAM (Random Access Memory) incorporated into the imaging apparatus 10. Here, the ROM stores programs or computation parameters used by the CPU. The RAM temporarily stores programs used by the CPU or parameters appropriately changed at the time of executing the programs. These units are connected to each other via a host bus constructed by a CPU bus or the like.

The basic configuration of the imaging apparatus 10 according to the embodiments of the present disclosure has been described hitherto. The image-capturing operation using the shutter mechanisms will be described in detail below with reference to the accompanying drawings.

(Image-Capturing Operation Using Mechanical Shutter Mechanism)

Figure 3:
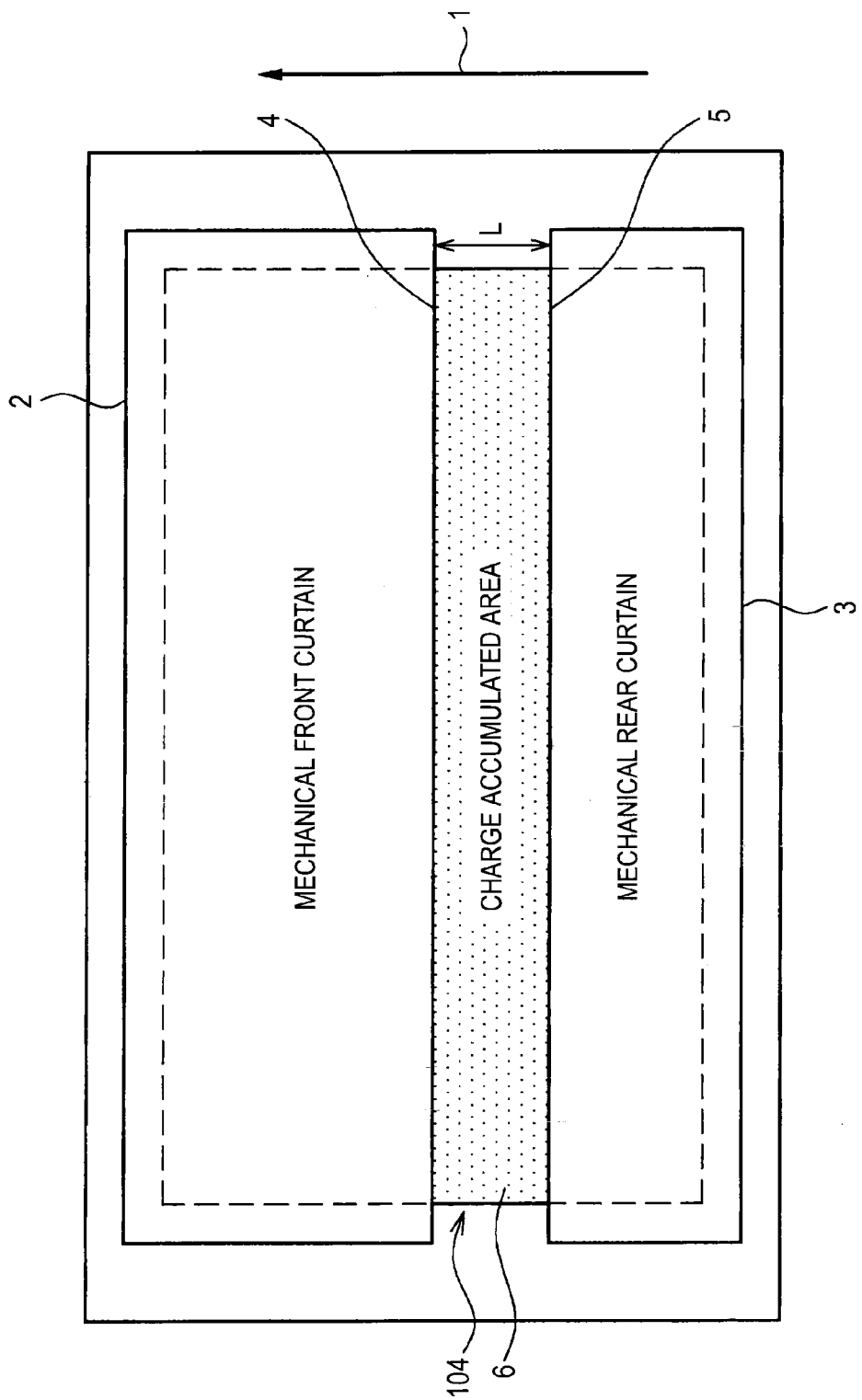
FIG. 3 is a front view illustrating an imaging device, a mechanical front curtain, and a mechanical rear curtain in a mechanical shutter mechanism according to the embodiments of the present disclosure as viewed along an optical axis direction from a lens side.

The image-capturing operation using the mechanical shutter mechanism will be first described with reference to FIG. 3. FIG. 3 is a front view illustrating the imaging device 104, a mechanical front curtain 2, and a mechanical rear curtain 3 as viewed along the optical axis direction from the lens side and shows a state where the mechanical front curtain is traveling and the mechanical rear curtain is traveling after the image-capturing operation is started by pressing the release button. The arrow 1 indicates the traveling direction of the mechanism front curtain 2 and the mechanical rear curtain 3.

FIG. 3 shows a state where the mechanical front curtain 2 and the mechanical rear curtain 3 of the mechanical shutter 105 shield a partial area of the imaging device 104.

An area 6 formed by a slit between an end 4 of the mechanical front curtain 2 and an end 5 of the mechanical rear curtain 3 is an area (charge accumulated area) which is not shielded by the mechanical front curtain 2 and the mechanical rear curtain 3 and in which charges are accumulated in the imaging device 104 due to the exposure. The charge accumulated area 6 moves in the direction of the arrow 1 with the traveling of the mechanical front curtain 2 and the mechanical rear curtain 3. The time until the imaging device 104 is shielded by the mechanical rear curtain 3 after the end 4 of the mechanical front curtain 2 passes, that is, after the incidence of light on the imaging device 104 is permitted, is a charge accumulating time due to the exposure of the pixels. Accordingly, by adjusting the slit width L, the charge accumulated area 6 can be changed to adjust the exposure time.

In this way, since the end 4 of the mechanical front curtain 2 travels in the direction of the arrow 1 to start the accumulation of charges in the lines, the charge accumulation start time varies among the lines of the imaging device 104. In the example shown in FIG. 3, the charge accumulating operation is performed at the earliest time in the line located at the lowermost position of the imaging device 104 and the charge accumulating operation is performed at the latest time in the line located at the uppermost position.

The traveling of the mechanical front curtain 2 and the mechanical rear curtain 3 from the lower part to the upper part of the imaging device 104 is controlled by the shutter driver 106. The shutter driver 106 adjusts the slit width L to control the exposure time (the shutter speed SS) by adjusting the time to start the traveling of the mechanical rear curtain 3.

(Image-Capturing Operation Using Electronic Shutter Mechanism)

Figure 4:
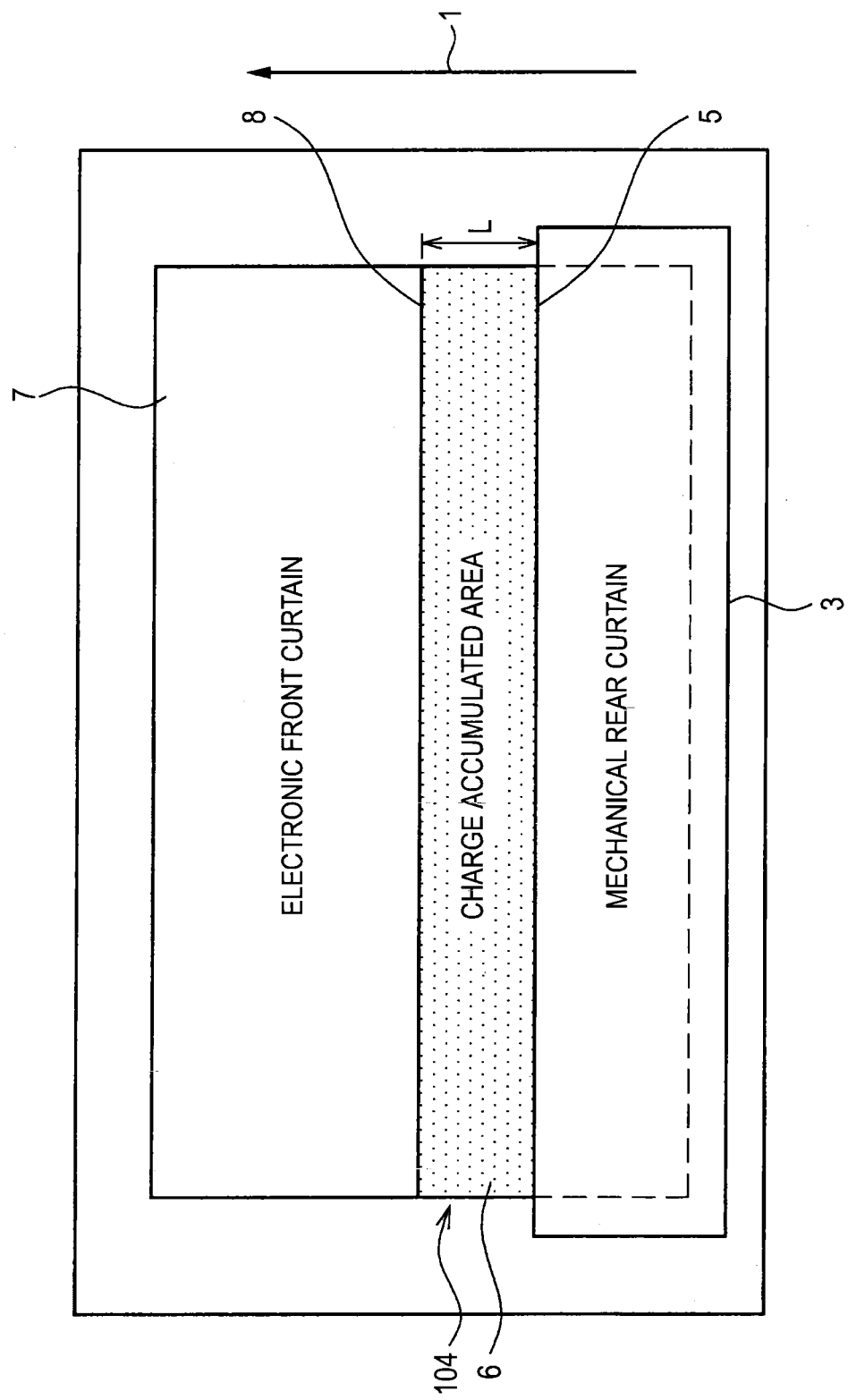
FIG. 4 is a front view illustrating an imaging device, an electronic front curtain, and a mechanical rear curtain in an electronic shutter mechanism according to the embodiments of the present disclosure as viewed along the optical axis direction from the lens side.

The image-capturing operation using the electronic shutter mechanism will be next described with reference to FIG. 4. FIG. 4 is a front view illustrating the imaging device 104 and the mechanical rear curtain 3 as viewed along the optical axis direction from the lens side and shows a state where the reset scanning is being performed in the imaging device 104 and the mechanical rear curtain 3 is traveling after the image-capturing operation is started by pressing the release button. The arrow 1 indicates the traveling direction (the traveling direction of the electronic front curtain 7) of the reset scanning and the traveling direction of the mechanical rear curtain 3.

FIG. 4 shows a state where the mechanical rear curtain 3 of the mechanical shutter 105 shields a partial area of the imaging device 104. A line (reset line) 8 of the reset scanning performed in the imaging device 104 is shown in FIG. 4. The reset line 8 is a line in which the amount of charges accumulated in the pixels is zero and corresponds to the end of an electronic front curtain 7.

The area 6 formed by the slit between the reset line 8 and the end 5 of the mechanical rear curtain 3 is an area (charge accumulated area) in which the charges are accumulated due to the exposure in the imaging device 104. The charge accumulated area 6 moves in the direction of the arrow 1 with the traveling of the electronic front curtain 7 and the mechanical rear curtain 3. The time until the imaging device 104 is shielded by the mechanical rear curtain 3 after the reset line 8 passes, that is, after the lines of pixels are sequentially reset in the direction of the arrow 1, is a charge accumulating time due to the exposure of the pixels. In this way, since the reset line 8 travels in the direction of the arrow 1 to start the accumulation of charges in the lines, the charge accumulation start time varies among the lines of the imaging device 104. In the example shown in FIG. 4, the charge accumulating operation is performed at the earliest time in the line located at the lowermost position of the imaging device 104 and the charge accumulating operation is performed at the latest time in the line located at the uppermost position.

The movement (the reset scanning) of the reset line 8 from the lower part to the upper part of the imaging device 104 is controlled by the vertical drive modulating unit 108. The movement pattern of the reset line 8 is referred to as a "scanning pattern". The scanning pattern indicates the time to perform the reset scanning on the lines of the imaging device 104, as described above. The scanning pattern storage unit 150 stores plural scanning patterns different, for example, in the focal distance, the exit pupil distance, and the like. The camera controller 130 selects one scanning pattern depending on the focal distance, the exit pupil distance, or the like of the mounted lens and controls the vertical drive modulating unit 108 to cause the reset line 8 to move along the selected scanning pattern.

(How to Reach Embodiments)

The electronic shutter mechanism can be expected to achieve the improvement in performance such as the shortening of a release time lag, the reduction of release noise, and the reduction of image fluctuation due to the shutter shake, compared with the mechanical shutter mechanism. However, the electronic shutter mechanism has a problem in that a phenomenon that a defocused image of a subject wanes occurs when the shutter speed is high (high SS) and the slit width is small.

The adjustment of the shutter speed will be described below. In general, the basic speed of the traveling speeds of the front curtain and the rear curtain is referred to as a curtain speed. When the shutter speed is lower than the curtain speed, it is possible to substantially lower the shutter speed (increase the exposure intensity) without changing the traveling speed of the curtains by delaying the traveling of the rear curtain to increase the slit width L and to maintain the opened state after the front curtain travels. On the other hand, when the shutter speed is higher than the curtain speed, it is possible to substantially raise the shutter speed (decrease the exposure intensity) without changing the traveling speed by shortening the time until the rear curtain travels after the front curtain travels to reduce the slit width L between the front curtain and the rear curtain and performing the exposure (see FIGS. 3 and 4). Accordingly, by adjusting the time until the rear curtain travels after the front curtain travels, it is possible to adjust the slit width L and thus to change the shutter speed SS from a low SS to a high SS.

The wane of a defocused image in the electronic shutter mechanism will be described below with reference to FIG. 5. FIG. 5 is a diagram illustrating a state of an imaging light beam at the center exposure position of an imaging plane. In FIG. 5, the upper part shows a so-called "rear-focused" state in which the imaging plane of the imaging device 104 is located closer than the focal point and the lower part shows the appearance of the defocus of the captured image at that time.

In the upper part of FIG. 5, the iris diaphragm 117a appears at the same position as the imaging lens 114, a position at which an upper part 51 of a light beam of the imaging lens 114 and a lower part 52 of a light beam of the imaging lens 114 intersect each other is a focal point 53, and the imaging plane of the imaging device 104 is located at a position closer to the imaging lens 114 than the focal point 53. In the imaging plane of the imaging device 104, the reset-scanning line (the reset line 8) corresponds to the end of the electronic front curtain 7. The mechanical rear curtain 3 is located at a position spaced apart by a gap R from the imaging device 104. The lower part of FIG. 5 shows an imaging plane 50 of the imaging device 104 as viewed from the front side.

Here, it is assumed that the iris aperture of the imaging lens 114 is circular. When the central area of the imaging device 104 is exposed at time of short-time exposure (high SS) in which the slit width L formed by the reset line 8 of the electronic front curtain and the end 5 of the mechanical rear curtain 3 is ¼000 sec to ½000 sec, a state where the lower part 52 of the light beam becomes black at the end 5 of the mechanical rear curtain 3 and the upper part 51 of the light beam does not become black at the reset line 8 (the end of the electronic front curtain) is generated due to the influence of the distance (gap R) between the imaging device 104 and the mechanical rear curtain 3. Accordingly, the wane of the defocused image that the lower part of a defocused image 55 in the rear-focused state to be circular is cut occurs.

The wane of the defocused image has a great influence on the image quality. When plural image data are synthesized to generate image data and the image with the wane of a defocused image is included in the image data before synthesis, the quality of the generated image data is markedly deteriorated.

In order to prevent the occurrence of the wane of a defocused image, it can be considered that the distance (gap R) between the imaging device 104 and the mechanical rear curtain 3 is reduced or the traveling speed of the mechanical rear curtain 3 is raised to increase the slit width L as much as possible. However, the reduction of the gap R is limited in design and the raising of the traveling speed of the mechanical rear curtain 3 has difficulty in control, which are not said to be the best solution.

On the other hand, paying attention to the fact that the wane of the defocused image does not occur at the time of performing the image capturing operation using the mechanical shutter mechanism at a high SS, the imaging apparatus according to the embodiments of the present disclosure is made, which prevents the wane of a defocused image and improves the quality of the image data by selecting one of the electronic shutter mechanism and the mechanical shutter mechanism depending on the situation. The point that the wane of a defocused image does not occur at the time of performing the image capturing operation using the mechanical shutter mechanism will be described in detail in "2. First Embodiment" to be described below.

2. First Embodiment (2-1) Important Configuration of Imaging Apparatus

In an imaging apparatus according to a first embodiment of the present disclosure, one of the image capturing operation using the mechanical shutter mechanism and the image capturing operation using the electronic shutter mechanism is selected by the use of the operation selecting unit 132 of the camera controller 130 shown in FIG. 2. Specifically, the operation selecting unit 132 selects a shutter mechanism on the basis of at least one of the shutter speed (SS), the F value, and the defocus value. The processes of the operation selecting unit 132 will be described in detail in "2-2. Operation Selecting Process of Imaging Apparatus".

The point that the wane of a defocused image does not occur at the time of performing the image capturing operation using the mechanical shutter mechanism at the high SS will be described below with reference to FIG. 6.

FIG. 6 is a diagram illustrating a state of a imaging light beam at the center exposure position of the imaging plane. In FIG. 6, the upper part shows a so-called "rear-focused" state in which the imaging plane of the imaging device 104 is located closer than the focal point 53 and the lower part shows the appearance of the defocus of the captured image at that time.

In the upper part of FIG. 6, the iris diaphragm 117a appears at the same position as the imaging lens 114, a position at which an upper part 51 of a light beam of the imaging lens 114 and a lower part 52 of a light beam of the imaging lens 114 intersect each other is a focal point 53, and the imaging plane of the imaging device 104 is located at a position closer to the imaging lens 114 than the focal point 53. The mechanical front curtain 2 and the mechanical rear curtain 3 are located at a position spaced apart by a gap R from the imaging device 104. The lower part of FIG. 6 shows the imaging plane 50 of the imaging device 104 as viewed from the front side.

Here, it is assumed that the iris aperture of the imaging lens 114 is circular. When the central area of the imaging device 104 is exposed at the time of the short-time exposure (high SS) in which the slit width L formed by the end 4 of the mechanical front curtain 2 and the end 5 of the mechanical rear curtain 3 is 1/4000 sec to 1/2000 sec, the wane of a defocused image 56 does not occur as shown in the lower part of FIG. 6. In this case, since the mechanical front curtain 2 and the mechanical rear curtain 3 are located at the same position, the upper part 51 of the light beam becomes black at the end 4 of the mechanical front curtain 2, the lower part 52 of the light beam becomes black at the end 5 of the electronic rear curtain 3, the upper part and the lower part of the defocused image are cut equal to each other. Accordingly, the defocused image 55 in the rear-focused state is circular.

The reason that the wane of the defocused image does not occur at the time of performing the image capturing operation using the mechanical shutter mechanism at a high SS (even when the slit width L is small) is described above. The shutter operation selecting process of the operation selecting unit 132 will be described in detail below.

(2-2) Operation Selecting Process of Imaging Apparatus

The process of the operation selecting unit 132 according to this embodiment will be described with reference to the flowchart shown in FIG. 7.

Figure 7:
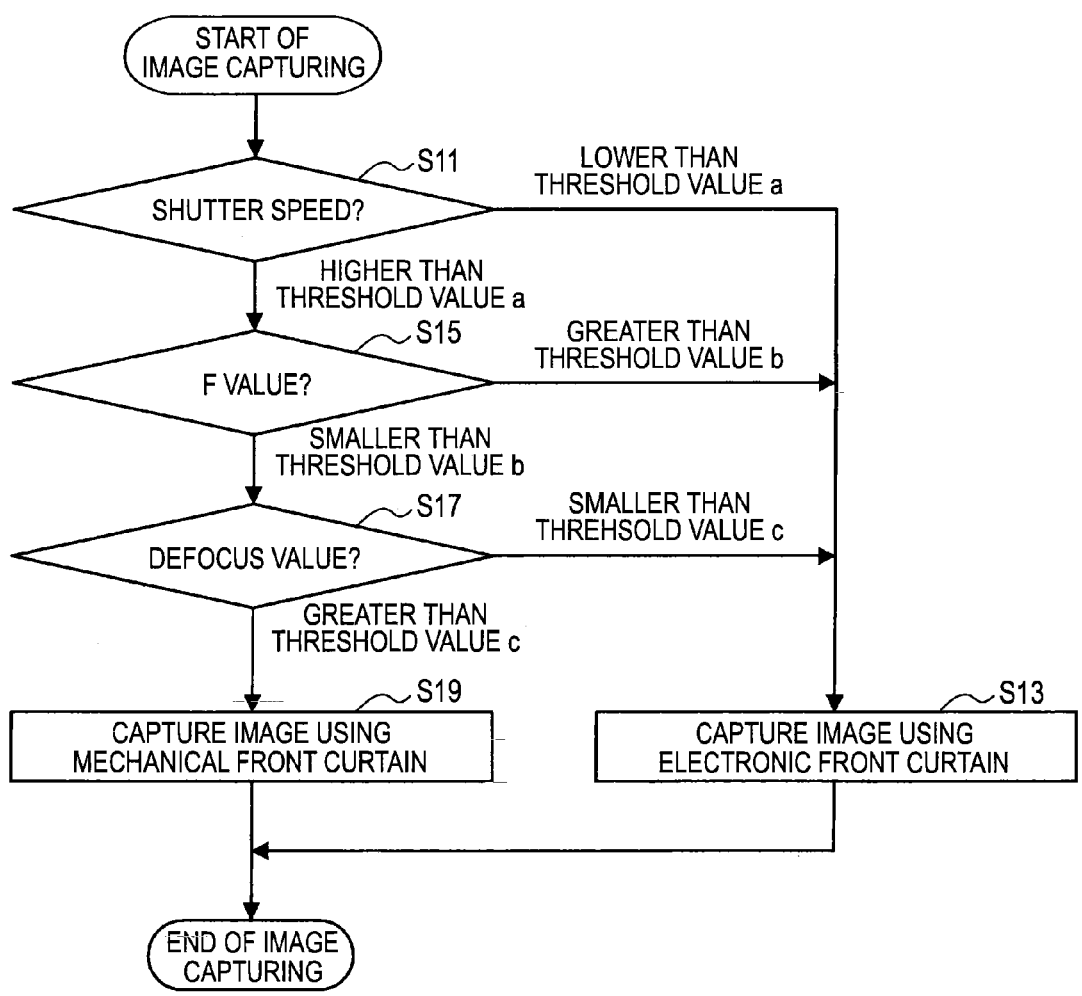
FIG. 7 is a flowchart illustrating a shutter operation selecting process according to a first embodiment of the present disclosure.

First, as shown in FIG. 7, the operation selecting unit 132 determines whether the shutter speed as one of control values of the image capturing operation is set to be a speed (high SS) higher than a threshold value a (step S11). The threshold value a is defined as a shutter speed when the front curtain and the rear curtain travel with a slit width L with which the wane of a defocused image could not occur at the time of performing the image capturing operation using the electronic shutter mechanism. For example, a shutter speed of 1/2000 sec or higher may be set as the threshold value a.

The case where the front curtain and the rear curtain travel with a slit width L with which the wane of a defocused image could not occur at the time of performing the image capturing operation using the electronic shutter mechanism will be described below with reference to FIG. 8.

The slit width L shown in the upper part of FIG. 8 is larger than the slit width L with which the wane of a defocused image shown in FIG. 5 occurs. In the state shown in FIG. 8 in which the slit width L is large, the exposure time of the imaging device 104 is longer than that in the state shown in FIG. 5. In other words, it can be said that the shutter speed in the state shown in FIG. 8 is lower than that in the state shown in FIG. 5. At this time, the lower part 52 of the light beam does not become black at the end 5 of the mechanical rear curtain 3 and the wane of a defocused image 57 does not occur as shown in the lower part of FIG. 8.

In this way, when the shutter speed is lower than the threshold value a and the wane of a defocused image does not occur at the time of performing the image capturing operation using the electronic shutter mechanism (lower than the threshold value a in step S12), the operation selecting unit 132 selects the image capturing operation using the electronic shutter mechanism (step S13). When the shutter speed is lower than the threshold value a, the upper part 51 of the light beam and the lower part 52 of the light beam do not become black at the mechanical front curtain 2 or the mechanical rear curtain 3 at the time of performing the image capturing operation using the mechanical shutter mechanism as shown in the upper part of FIG. 9 and the wane of a defocused image 58 does not occur as shown in the lower part of FIG. 9. However, since the image capturing operation using the electronic shutter mechanism improves the performance in view of the shortening of the release time lag, the reduction of release noise, and the like, the image capturing operation using the electronic shutter mechanism is selected in this embodiment.

On the other hand, when it is determined that the shutter speed is higher than the threshold value a (higher than the threshold value a in step S11), the operation selecting unit 132 then determines whether the F value is greater than a threshold value b (step S15). The F value may be acquired from the lens controller 115 of the lens unit 101 shown in FIG. 1 via the communication units 120 and 121. The threshold value b is defined as an iris value with which the wane of a defocused image does not occur at the time of performing the image capturing operation using the electronic shutter mechanism. For example, F2.8 may be set as the threshold value b.

The point that the wane of a defocused image does not occur at the time of performing the image capturing operation using the electronic shutter mechanism when the F value is greater than the threshold value b, that is, the F value is dark, will be described below with reference to FIG. 10.

As shown in the upper part of FIG. 10, when the shutter speed is higher than the threshold value a (the slit width L smaller) but the F value is greater than the threshold value b, the diameter of the light beam from the imaging lens 114 is smaller than the slit width L due to the iris diaphragm 117a and the lower part 52 of the light beam does not become black at the end 5 of the mechanical rear curtain 3. Accordingly, the wane of a defocused image 59 does not occur as shown in the lower part of FIG. 10. It can be said that the F value with which the wane of a defocused image does not occur is greater, that is, darker, than the F value with which the wane of a defocused image shown in FIG. 5 occurs.

In this way, when the F value is greater than the threshold value b and the wane of a defocused image does not occur at the time of performing the image capturing operation using the electronic shutter mechanism (greater than the threshold value b in step S15), the operation selecting unit 132 selects the image capturing operation using the electronic shutter mechanism (step S13). When the F value is greater than the threshold value b, the upper part 51 of the light beam and the lower part 52 of the light beam do not become black at the mechanical front curtain 2 or the mechanical rear curtain 3 as shown in the upper part of FIG. 11 and the wane of a defocused image 60 does not occur as shown in the lower part of FIG. 11. However, since the image capturing operation using the electronic shutter mechanism improves the performance in view of the shortening of the release time lag, the reduction of release noise, and the like, the image capturing operation using the electronic shutter mechanism is selected in this embodiment.

On the other hand, when it is determined that the shutter speed is higher than the threshold value a (higher than the threshold value a in step S11) and the F value is smaller than the threshold value b (smaller than the threshold value b in step S15), the operation selecting unit 132 then determines whether the defocus value is greater than a threshold value c (step S17).

When it is determined that the shutter speed is higher than the threshold value a (higher than the threshold value a in step S11) and the F value is smaller than the threshold value b (smaller than the threshold value b in step S15), a phenomenon may occur in which the lower part 52 of the light beam from the imaging lens 114 in the electronic shutter mechanism becomes black at the end 5 of the mechanical rear curtain 3 and the defocus image 55 wanes, as shown in FIG. 5. However, when a subject to be imaged is not defocused, it is not necessary to consider the wane of the defocused image. Accordingly, it is preferable that the image capturing operation using the electronic shutter mechanism having higher performance from the above-mentioned viewpoints. Therefore, the defocusing state of a subject is determined in step S17 on the basis of the defocus value.

When the defocus value is greater than the threshold value c (greater than the threshold value c in step S17), it can be said that a subject to be imaged is defocused. In this case, since the wane of a defocused image has a great influence on deterioration of the quality of image data, the image capturing operation using the mechanical shutter mechanism in which the wane of a defocused image does not occur is selected (step S19). On the other hand, when the defocus value is smaller than the threshold value c (smaller than the threshold value c in step S17), it is considered that a subject to be imaged is not defocused. In this case, since the wane of a defocused image has a small influence on the deterioration of the quality of the image data, the image capturing operation using the electronic shutter mechanism is selected (step S13).

This defocus value is calculated by the calculation unit 133 shown in FIG. 2. The defocus value calculating method performed by the calculation unit 133 is not particularly limited. For example, the defocus value may be calculated from the contrast component of the image data (subject image) generated by the signal processing unit 109, or may be calculated by installing an infrared sensor in the imaging apparatus and determining the distance from the subject using the reflected light of the infrared ray, or may be calculated by determining the distance from the subject on the basis of the feed distance of a lens (lens displacement). Here, the defocus value may be any one of the depth of field and the size of a defocused image.

In the flowchart shown in FIG. 7, the shutter speed, the F value, and the defocus value are sequentially determined, but the selection process of the operation selecting unit 132 according to this embodiment is not limited to the configuration. The shutter speed and F value, the shutter speed and defocus value, and the F value and defocus value may be sequentially determined. The determination order of the shutter speed and F value may be reversed. However, regarding the determination order of the shutter speed and defocus value and the F value and defocus value, it is preferable that the defocus value is determined later.

The operation selecting unit 132 may select the shutter operation on the basis of only any one of the shutter speed, the F value, and the defocus value.

3. Second Embodiment

Figure 12:
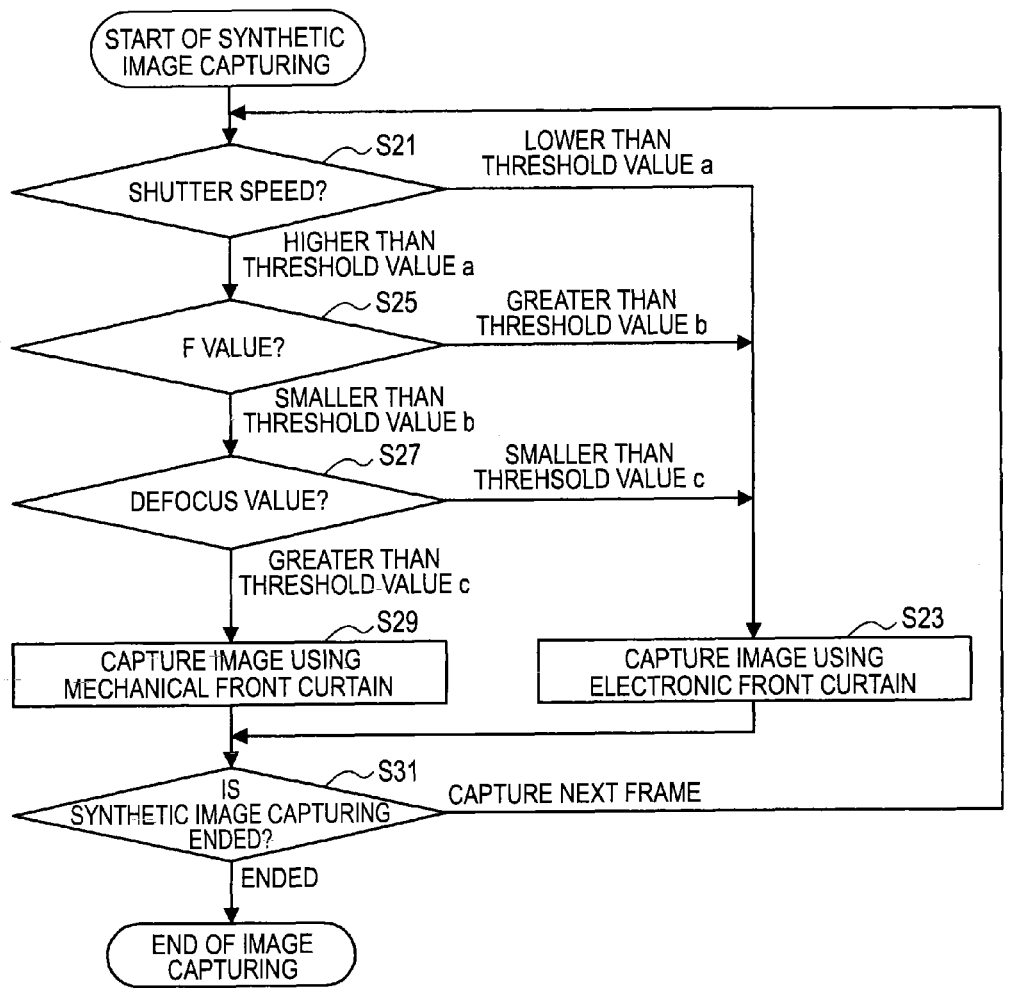
FIG. 12 is a flowchart illustrating a shutter operation selecting process according to a second embodiment of the present disclosure.

A second embodiment of the present disclosure will be described below with reference to the flowchart shown in FIG. 12. As shown in steps S21 to S29 of FIG. 12, in this embodiment, the image capturing operation is performed by the use of the shutter mechanism selected by the operation selecting unit 132, similarly to the first embodiment.

The captured image data is temporarily stored in the image storage unit 111 from the signal processing unit 109 shown in FIG. 1. Then, the camera controller 130 determines whether a synthesizing image capturing operation is ended (step S31). When it is determined that the synthesizing image capturing operation is not ended, the image capturing operation is performed again.

When the synthesizing image capturing is ended (ended in step S31), the signal processing unit 109 acquires the image data temporarily stored in the image storage unit 111 and performs a process of synthesizing the captured image data to generate image data.

As a process of synthesizing plural image data to generate image data, a high dynamic range (HDR) image capturing process of generating image data complemented to cover the contrast by synthesizing two or more pieces of image data having different image-capturing conditions such as exposure is known.

In the imaging apparatus 10 according to this embodiment, even when the image capturing method of synthesizing image data captured plural times is used, any one of the electronic shutter mechanism and the mechanical shutter mechanism can be selected by the operation selecting unit 132 to capture image data without the wane of a defocused image (at least the influence of the wane of a defocused image on the image quality is small). As a result, the signal processing unit 109 can generate high-quality synthesized image data on the basis of the image data without the wane of a defocused image.

4. Third Embodiment

In the above-mentioned embodiments, the image capturing operation is performed by the use of the shutter mechanism automatically selected by the operation selecting unit 132. Accordingly, an operator does not select the shutter mechanism at the time of capturing an image. Here, the image capturing operation using the electronic shutter mechanism and the image capturing operation using the mechanical shutter mechanism are different from each other in the magnitude of the release time lag or the magnitude of the shutter noise. Therefore, since the magnitude of the release time lag or the magnitude of the shutter noise is not always constant, it is considered that some operators may have a difficulty in using the imaging apparatus depending on the levels of the operators.

Therefore, in the third embodiment of the present disclosure, the type of the shutter mechanism selected by the operation selecting unit 132 is displayed on the display device 151. Accordingly, the operator can select the type of the shutter mechanisms before performing the image capturing operation.

Figure 13:
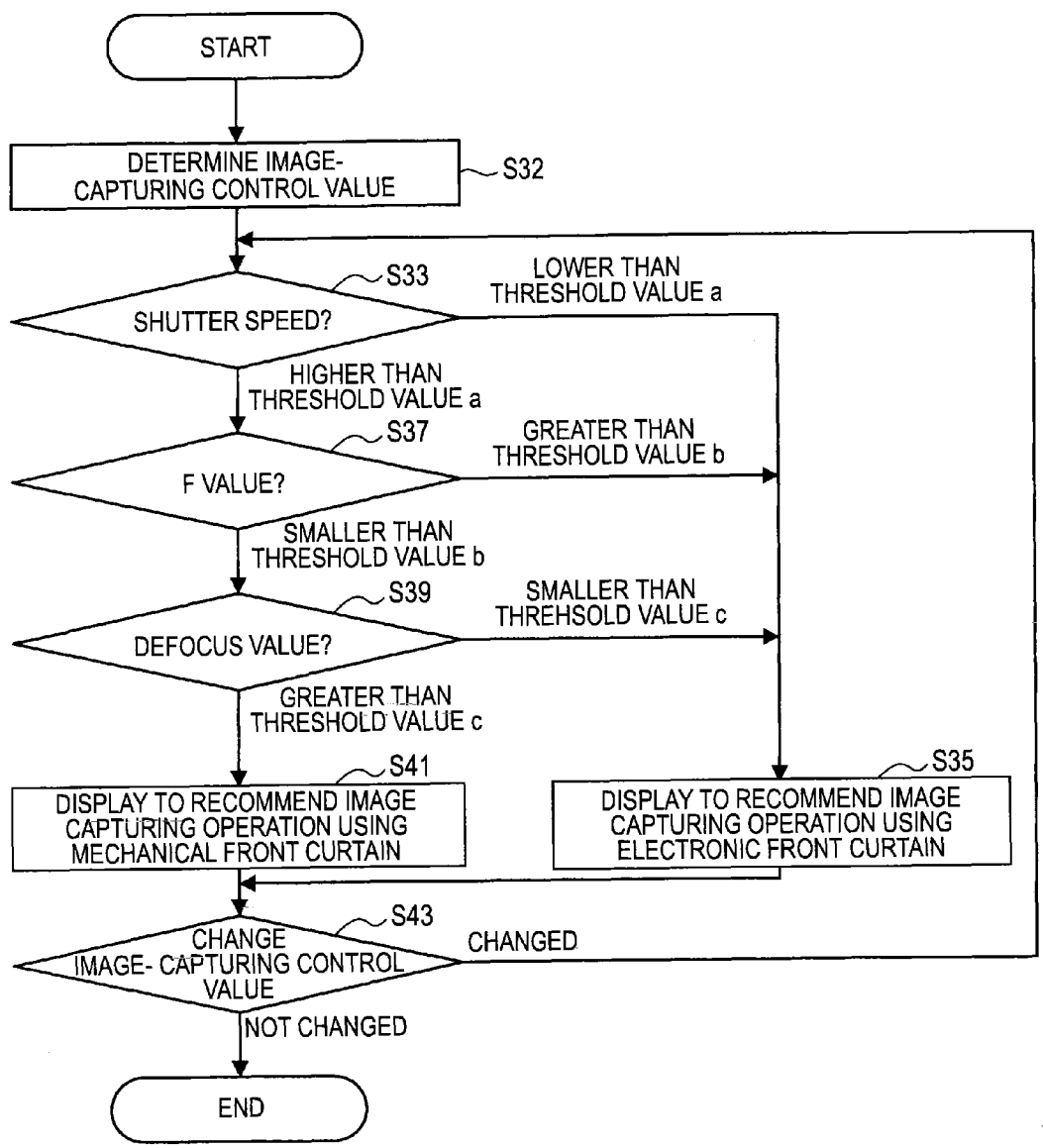
FIG. 13 is a flowchart illustrating a shutter operation selecting process according to a third embodiment of the present disclosure.

The operation in this embodiment will be described below with reference to the flowchart shown in FIG. 13. As shown in FIG. 13, after the image-capturing control values such as the shutter speed and the F value are determined (step S32), the operation selecting unit 132 selects one of the electronic shutter mechanism and the mechanical shutter mechanism in steps S33, S37, and S39, similarly to the first embodiment.

Then, the camera controller 130 controls the image display unit 110 to display the type of the selected shutter mechanism on the display device 151 (steps S35 and S41).

Accordingly, the imaging apparatus 10 can cause an operator (user) to confirm what shutter mechanism is effective for avoiding the wane of a defocused image in the image data to be captured. The operator can arbitrarily select a shutter mechanism used to perform the image capturing operation.

When the operator changes the image-capturing control values (changed in step S43), the shutter mechanism selecting process and the display process of steps S33 to S41 are performed again. On the other hand, when there is no change (not changed in step S43), the display process is ended.

5. Conclusion

As described above, in the imaging apparatuses 10 according to the embodiments of the present disclosure, it is possible to avoid the wane of a defocused image by selecting one of the electronic shutter mechanism and the mechanical shutter mechanism depending on at least any of the shutter speed, the F value, and the defocus value.

While the preferred embodiments of the present disclosure are described above with reference to the accompanying drawings, the present disclosure is not limited to the embodiments. The present disclosure can be clearly modified in various forms by those skilled in the art without departing from the technical concept described in the appended claims and the modifications should be understood to belong to the technical scope of the present disclosure.

For example, when the image-capturing mode of the imaging apparatus 10 is a manual mode, the shutter mechanism selecting process of the operation selecting unit 132 is inhibited and the image capturing operation is performed through the use of a shutter mechanism selected by an operator.

When the image-capturing mode of the imaging apparatus 10 is a scene automatic mode, the camera controller 130 may forcibly select one of the electronic shutter mechanism and the mechanical shutter mechanism depending on the set automatic mode. For example, when the set automatic mode is a sport mode, it is assumed that a subject to be imaged moves rapidly. Accordingly, the electronic shutter mechanism with a short release time lag is preferentially used over the mechanical shutter mechanism capable of preventing the wane of a defocused image. When the set automatic mode is a portrait, the wane of a defocused image has a great influence on the image quality. Accordingly, the shutter mechanism selecting process of the operation selecting unit 132 may be performed or the mechanical shutter mechanism may be forcibly selected.

In the imaging apparatus 10, since the mechanical rear curtain 3 of the mechanical shutter 105 is slowly accelerated from the start of the traveling, the slit width L is slowly increased from the start of the traveling to adjust the exposure time for each line of pixels of the imaging device 104. Therefore, the slit width L is the smallest at the time of the start of the traveling. Therefore, the operation selecting unit 132 may set the threshold values to the shutter speed, the F value, and the defocus value in which the wane of the defocus image with the slit width L at the time of starting the traveling does not occur.

For example, a computer program causing the hardware incorporated into the imaging apparatus 10 to perform the same functions as the elements of the imaging apparatus 10 may be implemented. A recording medium having the computer program recorded thereon may be also provided.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an imaging device that includes a plurality of pixels; and
circuitry configured to:
determine a front curtain operation from among an electronic front curtain operation performed by sequential reset-scan of lines of the pixels and a mechanical front curtain operation performed by travelling of a mechanical front curtain, based on one or more conditions including a defocus state condition; and
determine the front curtain operation is the mechanical front curtain operation in a case that a defocus value of the defocus state condition is greater than a threshold value.

2. The imaging apparatus according to claim 1, wherein the circuitry is further configured to determine the electronic front curtain operation as the front curtain operation in a case that the defocus state condition indicates that a subject is defocused.

3. The imaging apparatus according to claim 1, wherein the circuitry is further configured to perform a mechanical rear curtain operation regardless of the one or more conditions.

4. The imaging apparatus according to claim 1, wherein the circuitry is further configured to provide a notification regarding the determined front curtain operation.

5. The imaging apparatus according to claim 1, wherein the circuitry is further configured to perform the determined front curtain operation.

6. The imaging apparatus according to claim 1, wherein the determination of the front curtain operation by the circuitry is inhibited in a case that an image-capturing mode of the imaging apparatus is a predetermined image-capturing mode.

7. The imaging apparatus according to claim 6, wherein the predetermined image-capturing mode is a manual mode.

8. The imaging apparatus according to claim 1, wherein the circuitry is further configured to determine the front curtain operation regardless of the defocus state condition in a case that an image-capturing mode is a predetermined image-capturing mode.

9. The imaging apparatus according to claim 8, wherein the circuitry determines the electronic front curtain operation as the front curtain operation in a case that the predetermined image-capturing mode is a sports mode.

10. The imaging apparatus according to claim 8, wherein the circuitry determines the mechanical front curtain operation as the front curtain operation in a case that the predetermined image-capturing mode is a portrait mode.

11. The imaging apparatus according to claim 1, wherein the circuitry s further configured to define the one or more conditions according to a slit width formed by the mechanical front curtain and a mechanical rear curtain at a time of starting the travelling of the mechanical front curtain.

12. The imaging apparatus according to claim 1, wherein the one or more conditions further includes at least one of a slit width, a shutter speed and a F value.

13. The imaging apparatus according to claim 1, wherein the defocus value is one of a depth of field and a size of a defocused image.

14. A curtain operation control method, in an imaging apparatus having an imaging device including a plurality of pixels and circuitry which is configured to perform an electronic front curtain operation performed by sequential rest-scan of lines of the pixels and a mechanical front curtain operation performed by travelling a mechanical front curtain, the curtain operation control method comprising:
   detecting a defocus state condition;
   determining, using the circuitry, a front curtain operation from among the electronic front curtain operation and the mechanical front curtain operation, based on one or more conditions including the defocus state condition; and
   determining that the front curtain operation is the mechanical front curtain operation in a case that a defocus value of the defocus state condition is greater than a threshold value.

15. The curtain operation control method according to claim 14, further comprising:
   determining the electronic front curtain operation as the front curtain operation in a case that the defocus state condition indicates that a subject is defocused.

16. The curtain operation control method according to claim 14, further comprising:
   performing a mechanical rear curtain operation regardless of the one or more conditions.

17. The curtain operation control method according to claim 14, further comprising:
   providing a notification regarding the determined front curtain operation.

18. The curtain operation control method according to claim 14, further comprising:
   performing the determined front curtain operation.

19. The curtain operation control method according to claim 14, wherein
   the defocus value is one of a depth of field and a size of a defocused image.

20. A non-transitory computer readable recording medium having stored thereon a program enabling a computer to execute a curtain operation control method, in an imaging apparatus having an imaging device including a plurality of pixels and circuitry which is configured to perform an electronic front curtain operation performed by sequential rest-scan of lines of the pixels and a mechanical front curtain operation performed by travelling a mechanical front curtain, the curtain operation control method comprising:
   detecting a defocus state condition;
   determining a front curtain operation from among the electronic front curtain operation and the mechanical front curtain operation, based on one or more conditions including a defocus state condition; and
   determining that the front curtain operation is the mechanical front curtain operation in a case that a defocus value of the defocus state condition is greater than a threshold value.

21. The non-transitory computer readable recording medium according to claim 20, wherein
   the defocus value is one of a depth of field and a size of a defocused image.

* * * * *